UNITED STATES PATENT OFFICE.

FRIEDRICH REUBOLD, OF LUDWIGSHAFEN, GERMANY, ASSIGNOR TO BADISCHE ANILIN AND SODA FABRIK, OF LUDWIGSHAFEN, GERMANY, A CORPORATION OF GERMANY.

BLACK SULFUR DYE AND PROCESS OF MAKING SAME.

SPECIFICATION forming part of Letters Patent No. 695,835, dated March 18, 1902.

Application filed December 23, 1901. Serial No. 87,012. (No specimens.)

*To all whom it may concern:*

Be it known that I, FRIEDRICH REUBOLD, doctor of philosophy and chemist, and a subject of the King of Bavaria, residing at Ludwigshafen-on-the-Rhine, in the Kingdom of Bavaria, Germany, have invented new and useful Improvements in Black Coloring-Matters, of which the following is a specification.

This invention relates to a new substantive black coloring-matter for cotton.

In this invention use is made of a product arising from the action of trinitro-meta-dichlor-benzene on para-amido-phenol. This product when suitably heated with sodium sulfid and sulfur yields the new black coloring-matter.

The nature of this invention is further illustrated in the following examples. The invention, however, is not limited to the conditions and proportions therein given. The parts are by weight, and the temperature degrees refer to the centigrade scale.

*Example 1—Production of trinitro-meta-dichlor-benzene.*—Introduce four hundred (400) parts of dinitro-meta-dichlor-benzene into a mixture of two hundred and eighty (280) parts of nitric acid containing ninety-four (94) per cent. of that acid ($HNO_3$) and eight hundred (800) parts of fuming sulfuric acid containing twenty-three (23) per cent. of free sulfuric anhydride, ($SO_3$.) Heat the whole for about three hours to a temperature of from one hundred and forty (140°) to one hundred and forty-five (145°) degrees, stirring the meanwhile. Cool and pour the result upon twenty-five hundred (2500) parts of ice. Collect the solid material, and, if desired, it may be purified by recrystallization from alcohol. So purified this trinitro-para-dichlor-benzene melts at about one hundred and twenty-eight (128°) degrees.

*Example 2—Production of dipara-hydroxy-phenyl-trinitro-meta-phenylene-diamin.*—Pour two thousand (2,000) parts of alcohol upon one hundred and forty (140) parts of trinitro-meta-dichlor-benzene, one hundred and fifty (150) parts of the hydrochloric salt of para-amido-phenol, and three hundred (300) parts of crystallized sodium acetate. Heat to boiling under a return-condenser, stirring the meanwhile. Continue this until further increase in the quantity of the red product is not observable. Now filter and wash the solid material with water and dry it. The dipara-hydroxy-phenyl-trinitro-meta-phenylene-diamin so obtained can be crystallized from ethyl alcohol in the form of brick-red leaflets, which melt, with decomposition, at about two hundred and twenty-five (225°) degrees.

*Example 3—Production of coloring-matter.*—Introduce fifty (50) parts of dipara-hydroxy-phenyl-trinitro-meta-phenylene-diamin into a mixture of two hundred (200) parts of crystallized sodium sulfid, sixty (60) parts of sulfur, and two hundred (200) parts of water. Stir the whole and gradually raise its temperature, which induces a vigorous reaction. When this has subsided somewhat, gradually raise the temperature by means of, say, an oil-bath to about one hundred and sixty (160°) to one hundred and eighty (180°) degrees and maintain this temperature until the melt has solidified and can be reduced to powder. Cool and powder this result, which may be directly employed in dyeing.

The so-obtained product is of a black color and produces a greenish-colored solution with water, which solution becomes bluer by addition of sodium sulfid to it. With concentrated sulfuric acid it produces a dirty-green color. It dyes cotton a greenish-black shade, which is rendered of a bluer cast by treatment with a solution of hydrogen peroxid to which ammonia has been added.

What is claimed is—

As a new article of manufacture black coloring-matter which can be made from dipara-hydroxy-diphenyl-trinitro-meta-phenylene-diamin, sulfur and sodium sulfid, which is a black substance soluble in water giving a greenish-colored solution which solution becomes bluer on treatment with sodium sulfid, which coloring-matter gives a dirty-green color with concentrated sulfuric acid and dyes unmordanted cotton a greenish-black shade which is rendered of a bluer cast by treatment with a solution of hydrogen peroxid to which some ammonia has been added.

In testimony whereof I have hereunto set my hand in presence of two subscribing witnesses.

FRIEDRICH REUBOLD.

Witnesses:
BERNHARD C. HESSE,
JACOB ADRIAN.